United States Patent [19]

Takei

[11] Patent Number: 5,726,729
[45] Date of Patent: Mar. 10, 1998

[54] LIQUID CRYSTAL DISPLAY DEVICE

[75] Inventor: Jiro Takei, Hachioji, Japan

[73] Assignee: Casio Computer Co., Ltd., Tokyo, Japan

[21] Appl. No.: 681,010

[22] Filed: Jul. 22, 1996

[30] Foreign Application Priority Data

Aug. 1, 1995 [JP] Japan ................... 7-213958

[51] Int. Cl.$^6$ ............. G02F 1/1337; G02F 1/13; G02F 19/60
[52] U.S. Cl. .................. 349/180; 349/128; 349/165
[58] Field of Search ................... 349/128, 165, 349/124, 180

[56] References Cited

U.S. PATENT DOCUMENTS 4,783,148  11/1988  Tsuboyama et al. ............... 349/128
5,446,569   8/1995  Iwai et al. ........................... 349/124
5,574,593  11/1996  Wakita et al. ........................ 349/74

Primary Examiner—William L. Sikes
Assistant Examiner—Julie Ngo
Attorney, Agent, or Firm—Frishauf, Holtz, Goodman, Langer & Chick

[57] ABSTRACT

A liquid crystal display device comprising a first substrate having a first electrode and a homeotropic aligning film formed thereon, a second substrate having a second electrode and a homogeneous aligning film formed thereon, and a chiral nematic liquid crystal sealed between the first and second substrates. One % by weight of a dichroic dye is added to the chiral nematic liquid crystal. The liquid crystal molecules of this liquid crystal display device has a twist angle $\theta$ of $0.5\pi$ radians or greater and smaller than $(5/3)\pi$ radians. The cell gap d of the liquid crystal display device and the natural pitch p of the nematic liquid crystal are selected in such a way that d/p satisfies an inequality (9):

$$(\theta/2\pi)-(1/4)<d/p<(\theta/2\pi)+(1/4) \qquad (9)$$

13 Claims, 4 Drawing Sheets

LIQUID CRYSTAL DISPLAY DEVICE

BACKGROUND OF THE INVENTION

1. Field of the Invention

The present invention relates to a liquid crystal display device, and, more particularly, to a liquid crystal display device which uses a chiral nematic liquid crystal containing dichroic dye.

2. Description of the Related Art

Conventional liquid crystal display (LCD) devices comprise a liquid crystal (LC) cell and a pair of polarization plates sandwiching the LC cell. To provide desired display, the LCD device with this structure changes the intensity of the light passing the pair of polarization plates by controlling the voltage to be applied to the liquid crystal and controlling the birefringence of the liquid crystal.

The conventional LCD device using polarization plates suffers a considerable light loss, caused by the polarization plates, and dark display.

As a solution to this shortcoming, a White-Taylor mode LCD device has been proposed which uses phase transition between the nematic phase and cholesteric phase. The White-Taylor mode LCD device uses liquid crystal material containing dichroic dye and controls the voltage applied to the liquid crystal material to switch the nematic phase and cholesteric phase from one to the other. In the cholesteric phase, the LC molecules and the dichroic dye are directed in various directions to absorb the light passing the LC layer, thus providing "dark" display. In the nematic phase where the LC molecules are aligned substantially perpendicular to the substrate, the amount of light absorbed by the dichroic dye decreases, thus providing "bright" display.

Because the conventional White-Tailor mode LCD device utilizes the phase transition of the liquid crystal, however, the optical response to the applied voltage becomes discontinuous and the electro-optical characteristic has a large hysteresis. Accordingly, this LCD device can provide binary display but cannot provide gradation display.

Those problems may be overcome by using a chiral nematic (N*) liquid crystal added with a dichroic dye and utilizing the effect of the phase transition between the chiral nematic phase where the LC molecules are twisted on a plane parallel to the substrate and the nematic phase where the LC molecules are aligned substantially perpendicular to the substrate. This scheme can also decrease the hysteresis to a certain degree by setting the twist angle of the liquid crystal and the ratio of the thickness d of the LC layer to the helical pitch p.

But, LCD devices using the N* liquid crystal need a high drive voltage and have a sharp change in the electro-optical characteristic (particularly, a change at the beginning of the rising is sharp) and a relatively large hysteresis. It is therefore difficult to finely control the gradation.

SUMMARY OF THE INVENTION

Accordingly, it is an object of the present invention to provide an LCD device using a dichroic dye, which can finely control the gradation.

To achieve the above object, an LCD device according to first aspect of this invention comprises:

a first substrate with a first electrode formed thereon and subjected to a substantial homeotropic aligning treatment;

a second substrate facing the first substrate with a predetermined gap therebetween, having a second electrode formed on a surface facing the first substrate and subjected to an homogeneous aligning treatment in a predetermined direction; and a chiral nematic liquid crystal aligned at the predetermined twist angle, sealed between the first and second substrates and added with a dichroic dye.

An LCD device according to the second aspect of this invention comprises:

first and second substrates;

a liquid crystal sealed between the first and second substrates, aligned substantially homeotropicly in a vicinity of the first substrate, aligned substantially homogeneously in a vicinity of the second substrate, and twisted toward the first substrate from the second substrate within an angle of $0.5\pi$ radians or greater and smaller than $(5/3)\pi$ radians;

a dichroic dye added to the liquid crystal; and drive means for applying a voltage to the liquid crystal to control an alignment state thereof.

It is desirable that the liquid crystal (chiral nematic liquid crystal) satisfy an inequality (1) involving a cell gap d, a twist angle $\theta$ (radians) and a natural pitch p, and it is more desirable that the liquid crystal satisfy an inequality (2) also involving the cell gap d, twist angle $\theta$ and natural pitch p.

$$(\theta/2\pi)-(1/4)<d/p<(\theta/2\pi)+(1/4) \quad (1)$$

$$\theta/2\pi<d/p<(\theta/2\pi)+(1/4) \quad (2)$$

As the LCD device with the above structure displays an image by controlling the light absorption and light transmittance due to the dichroic dye, this LCD device can present bright display images and is thus suitable as a reflection type device.

The aligning film on one of the substrates is a homeotropic aligning film, so that the LC molecules are likely to be aligned in accordance with a change in the applied voltage. It is therefore possible to provide an LCD device whose electro-optical characteristic has a small hysteresis and shows a gentle rise.

DETAILED DESCRIPTION OF THE PREFERRED EMBODIMENT

A guest-host mode LCD device according to one embodiment of the present invention will now be described with reference to the accompanying drawings.

Figure 1:
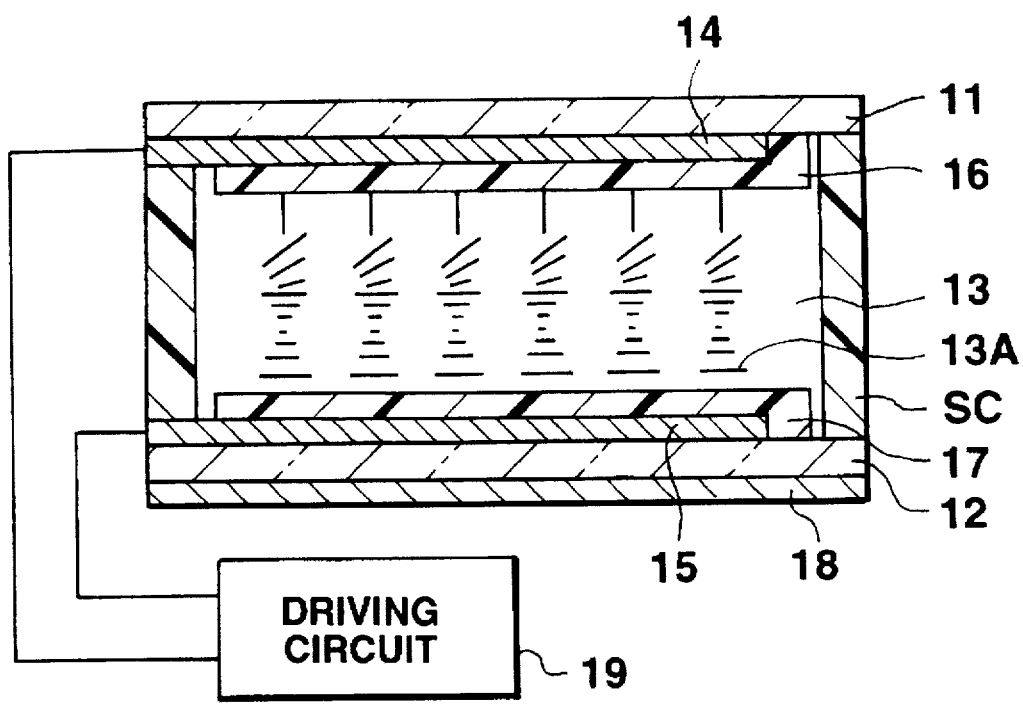
FIG. 1 is a cross-sectional view showing the structure of an LCD device embodying this invention.

FIG. 1 shows the structure of the LCD device according to this embodiment.

As illustrated, the LCD device of this embodiment comprises a pair of substrates 11 and 12 arranged facing each other, a seal member SC for bonding both substrates 11 and 12 at peripheral portions thereof, and a nematic liquid crystal 13 sealed between both substrates 11 and 12. A plurality of opposing electrodes 14 and 15 are respectively formed on the inner surfaces of the substrates 11 and 12. Aligning films 16 and 17 are respectively formed on the electrodes 14 and 15.

Figure 2:
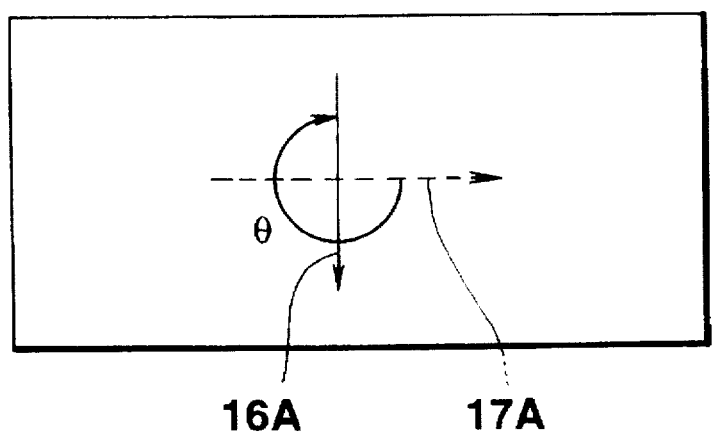
FIG. 2 is a diagram used for explaining the direction of an aligning treatment performed on an aligning film and the twist direction of the liquid crystal.

The aligning film 16 is formed by spin-coating a homeotropic alignment agent on the substrate 11 on which the electrodes 14 are formed, and then performing an aligning treatment like rubbing in a predetermined direction 16A shown in FIG. 2.

The aligning film 17 is formed by spin-coating a homogeneous alignment agent on the substrate 12 on which the electrodes 15 are formed, and then performing an aligning treatment like rubbing in a direction 17A which intersects the predetermined direction 16A at an angle of $0.5\pi$ radians to $1.5\pi$ radians (90 degrees to 270 degrees), as shown in FIG. 2.

A driving circuit 19 applies a voltage between the electrodes 14 and 15 to drive this LCD device.

A reflector 18 made of an aluminum film or the like is located at the back of the substrate 12.

The liquid crystal 13 is a nematic liquid crystal with a positive dielectric constant anisotropy to which a chiral substance is added. The liquid crystal 13 is sealed between the first and second substrates 11 and 12 in such a way as to be aligned homeotropicly in the vicinity of the aligning film 16, aligned homogeneously in the vicinity of the aligning film 17, and twisted at an angle of $0.5\pi$ radians to $1.5\pi$ radians by twisting effect of the chiral substance. A black dichroic dye is added to the liquid crystal 13 at a ratio of approximately 0.5 to 3% by weight and has a positive absorption anisotropy.

The ratio d/p of the layer thickness, d (μm), of the liquid crystal 13 (the distance between the aligning films 16 and 17) to the natural pitch (helical pitch of liquid crystal with bulk state), p (μm), of the liquid crystal 13, and the twist angle θ (radians) of LC molecules 13A are so set as to fulfill the following inequality (3).

$$(\theta/2\pi)-(¼) < d/p < (\theta/2\pi)+(¼) \quad (3)$$

More specifically, the value of d/p is set greater than the value which is obtained by subtracting ¼ from the value of d/p at which the liquid crystal is twisted at the twist angle θ (radians) between the opposing substrates 11 and 12 without causing twist deformation (d/p=θ/2π), and smaller than that value of d/p plus ¼. When the value of d/p is off this specified range, improper alignment or a stripe domain occurs in which the liquid crystal 13 is partially aligned at an angle greater than π radians than the twist angle θ or at an angle smaller than π radians than the twist angle θ. In this case, the liquid crystal 13 cannot be aligned at the desired twist angle θ. In view of the above, the value of d/p is so set as to satisfy the inequality (3).

It is desirable that the value of d/p be so set as to satisfy the following inequality (4).

$$\theta/2\pi < d/p < (\theta/2\pi)+(¼) \quad (4)$$

More specifically, it is desirable that the value of d/p should be set greater than the value of d/p at which the liquid crystal is twisted at the twist angle θ (radians) between the opposing substrates 11 and 12 without causing twist deformation (d/p=θ/2π), and smaller than that value of d/p plus ¼. When the value of d/p is greater than θ/2π, the liquid crystal 13 is twisted by a predetermined twist angle θ (radians) before reaching the layer thickness d of the liquid crystal 13. Therefore, the liquid crystal 13 is twisted by the desired twist angle θ (radians) with the lengthwise molecular axes of the liquid crystal 13 set approximately parallel to the substrate 12, before reaching the aligning film 16 undergone the vertical aligning treatment from the surface of the aligning film 17 undergone the homogeneous aligning treatment. In the vicinity of the aligning film 16, the liquid crystal 13 is aligned in such a way that the lengthwise molecular axes of the liquid crystal 13 gradually become perpendicular to the substrate 11. Thus, the liquid crystal 13 is twisted with suppressed twist deformation and suppressed spray deformation.

If d/p of the LCD device is set not to satisfy the inequality (4), on the other hand, the liquid crystal 13 has both the twist deformation and spray deformation. The alignment state of the liquid crystal 13 is likely to become uneven, causing a spot-like alignment failure. The alignment state having twist and spray deformation causes discontinuous alignment change in accordance with the applied electric field. This discontinuous alignment change may increase the hysteresis of the electro-optical characteristics.

As the liquid crystal 13 is aligned with suppressed twist deformation and suppressed spray deformation as mentioned above, the lengthwise molecular axes of the liquid crystal 13, when applied with an electric field, are gradually changed in the perpendicular direction to the substrate in accordance with the intensity of the applied electric field, so that the alignment state continuously changes. Therefore, the electro-optical characteristic of the LCD device whose liquid crystal 13 has the value of d/p so set as to meet the condition of the inequality (4) continuously changes and has a small hysteresis.

Figure 3A:
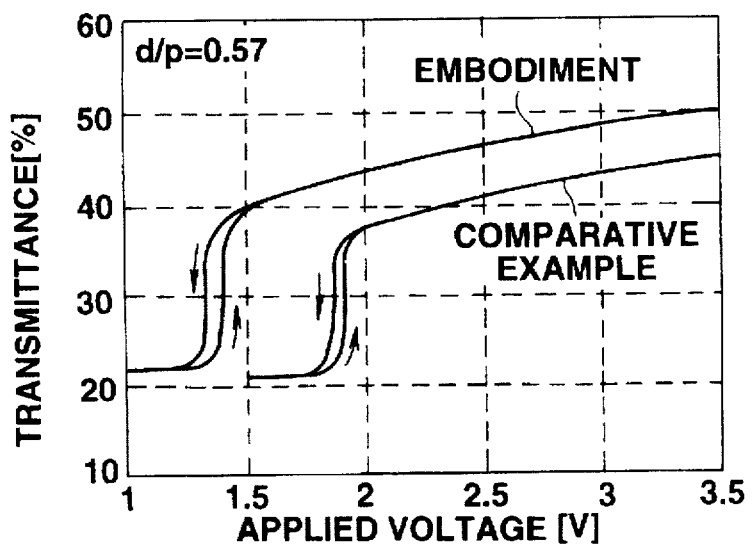
FIGS. 3A through 3C are diagrams showing electro-optical characteristics of the LCD device as the ratio d/p of the cell gap d to the natural pitch p of the liquid crystal is changed.
Figure 3B:
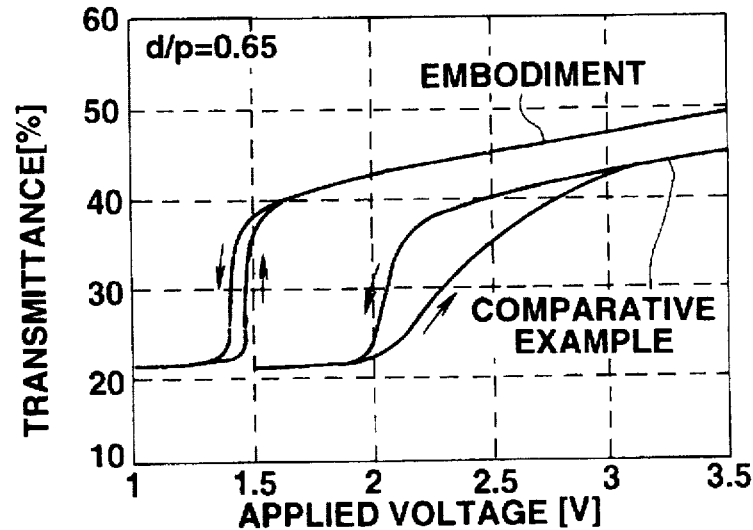
Figure 3C:
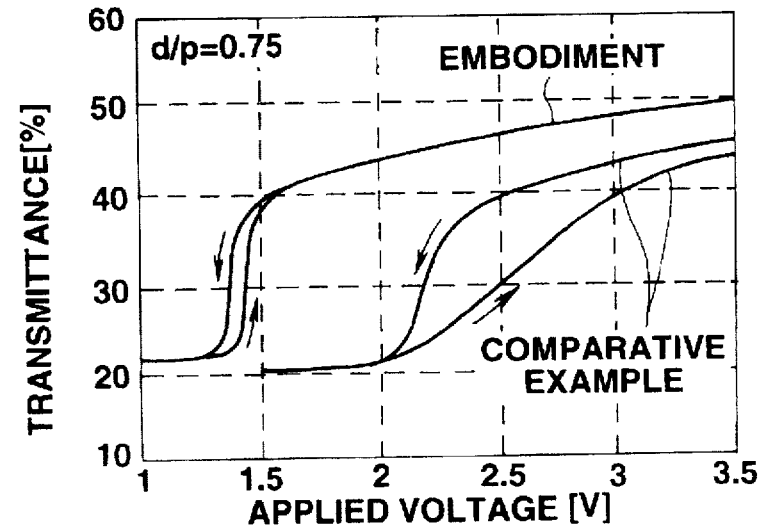

FIGS. 3A through 3C show examples of the electro-optical characteristic (voltage v.s. transmittance characteristic) in the case where a nematic liquid crystal in use has a positive dielectric anisotropy, a refractive index anisotropy Δn=0.085 and a nematic-isotropic transition temperature of 73° C., d=11 μm, 1% by weight of a black dye is added as the dichroic dye, θ is fixed to $1.5\pi$ radians (270 degrees), and the applied voltage is changed for different values of d/p.

In this case, θ/2π−¼ in the inequality (3) is 0.5 and θ/2π is 0.75 and all the examples meet the inequality (3).

For the purpose of comparison, the electro-optical characteristics for the case where the aligning films 16 and 17 are both homogeneous aligning films are also illustrated in the diagrams.

As shown in FIG. 3A, the electro-optical characteristic for the example with d/p of 0.57 has a small hysteresis even though it has a gap in the vicinity of the voltage of 1.3 V. Further, the transmittance has a gentle change in the vicinity of the rising voltage for the liquid crystal.

As shown in FIGS. 3B and 3C, the electro-optical characteristics for the examples with d/p of 0.65 and 0.75 have small hysteresis even though they have gaps in the vicinity of the voltage of 1.3 V.

As compared with the comparison examples shown in FIGS. 3A to 3C, the position of the gap in the electro-optical characteristic in this embodiment becomes lower by approximately 0.5 to 0.7 V and the transmittance at each voltage becomes higher. Therefore, the transmittance becomes relatively higher.

With d/p being smaller than 0.5 (θ/2π−¼), the twist angle in the initial alignment state does not become 1.5π radians (270 degrees) but becomes 0.5π radians (90 degrees) which is smaller by π radians (180 degrees) than 1.5π radians. With d/p=0.5, logically, there is a 50% chance that the twist angle becomes 1.5π radians and 0.5π radians. Therefore, the liquid crystal becomes a very instable alignment state where the twist angle becomes the more stable one of 1.5π radians and 0.5π radians depending on a slight variation in the cell gap d of the LC cell.

Figure 4:
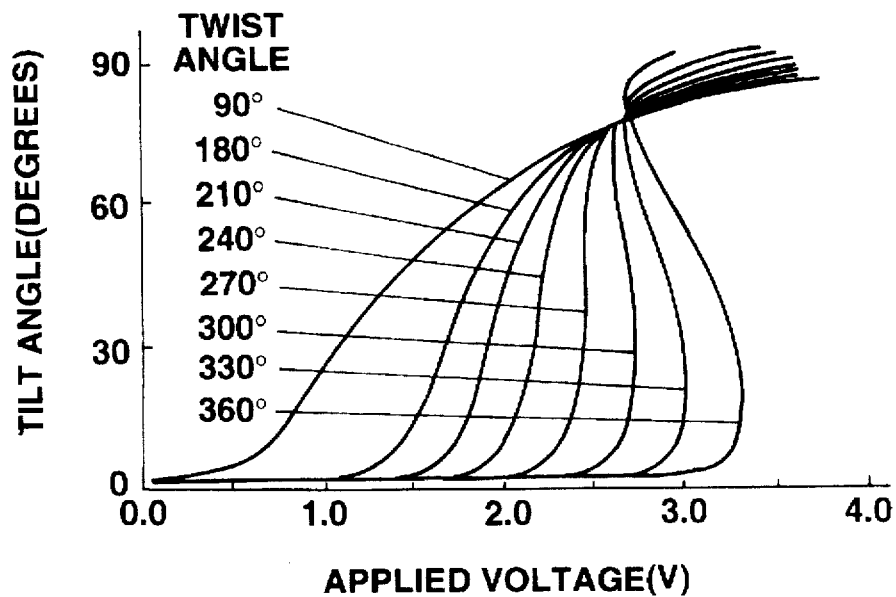
FIG. 4 is a diagram depicting the relationship between the applied voltage and the tilt angle for each twist angle.

With the twist angle equal to or smaller than 0.5π radians (90 degrees), incident light may not be absorbed depending on the polarization direction, thus increasing the amount of leak light. To reduce the leak light, the twist angle should desirably be equal to or greater than π radians (180 degrees). When the twist angle is equal to or greater than 5/3π radians (300 degrees), as shown in FIG. 4, the area where the tilt angle turns negative occurs as the applied voltage rises, thus making the alignment instable. In this respect, the twist angle θ is set equal to or greater than 0.5π radians and less than 5/3π radians, desirably to π radians or above and less than 5/3π radians.

As discussed above, by setting the twist angle θ between π radians and 5/3π radians and setting the ratio d/p of the cell gap d to the pitch p to satisfy the inequality (3), it is possible to provide an LCD device which has a small hysteresis and can change the transmittance step by step by changing the applied voltage.

It is to be noted that this invention is not limited to the above-described embodiment, but may be modified and adapted in various other forms.

Although the above-described embodiment is a simple matrix (passive matrix) type LCD device, this invention is also adapted to an active matrix type N* LCD device which uses TFTs, MIMs or the like as switching elements.

Figure 5:
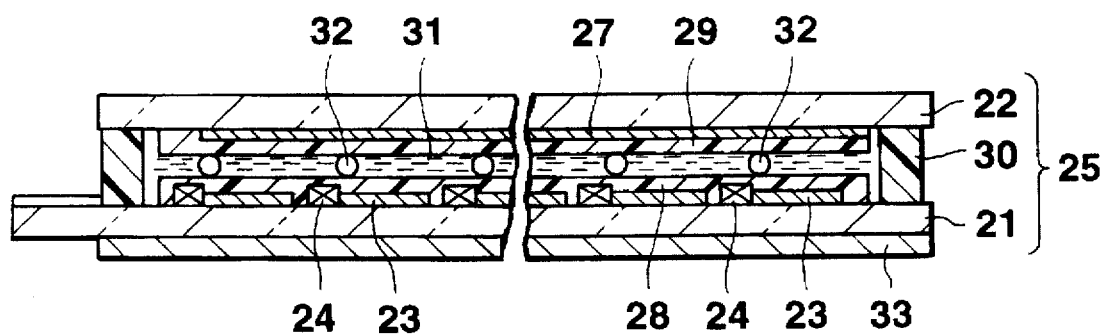
FIG. 5 is a cross-sectional view showing the structure of an active matrix type LCD device to which this invention is adapted.

FIG. 5 exemplifies the structure of a TFT type LCD device to which this invention is adapted. As illustrated, this LCD device comprises a pair of transparent substrates (e.g., glass substrates) 21 and 22 bonded by a seal member 30, and an LC cell 25 formed by sealing a liquid crystal 31 between the substrates 21 and 22. To keep the cell gap d, spacers 32 are located between the substrates 21 and 22.

A reflector 33 made of an aluminum film or the like is located at the back of the substrate 21.

Formed on the lower transparent substrate (hereinafter referred to as "lower substrate") are a matrix of pixel electrodes 23 made of a transparent conductive material like ITO and a matrix of thin film transistors (TFTs) 24 whose source electrodes are connected to the respective pixel electrodes 23.

Formed on the upper transparent substrate (hereinafter referred to as "upper substrate") is opposing electrodes 27 which face the individual pixel electrodes 23 of the lower substrate 21 and are supplied with a reference voltage. The opposing electrodes 27 are transparent electrodes formed of ITC or the like, for example.

Aligning films 28 and 29 are respectively formed on the electrode-forming surfaces of the lower substrate 21 and the upper substrate 22. As in the above-described case of a simple matrix type LCD device, one of the aligning films 28 and 29 is a homeotropic aligning film subjected to an aligning treatment, while the other aligning film 28 or 29 is a homogeneous aligning film subjected to an aligning treatment in a predetermined direction.

The liquid crystal 31 used in this example is a chiral nematic liquid crystal added with a dichroic dye, the same type as used in the above-described simple matrix type LCD device.

Gate lines are laid between rows of pixel electrodes 23, and unillustrated data lines (gradation signal lines) are laid between columns of pixel electrodes 23. The individual TFTs 24 have gate electrodes connected to the associated gate lines and drain electrodes connected to the associated data lines.

A gate voltage is applied to the gate lines, and a data signal corresponding to image data is applied to the data lines. The desired gradation display is obtained by applying a voltage between each pixel electrode 23 and the associated opposing electrode 27 and controlling the alignment state of the liquid crystal 31.

Figure 6:
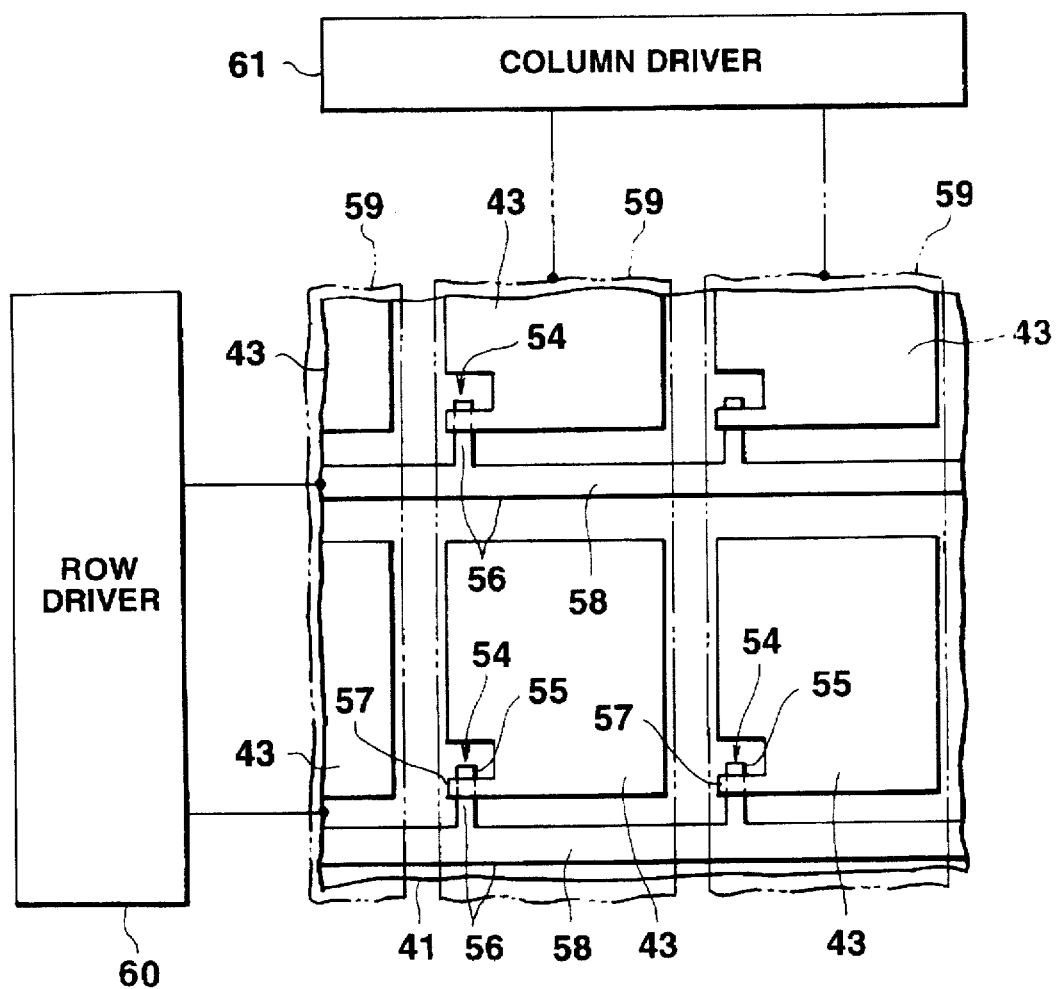
FIG. 6 is a plan view showing the substrate structure of a MIM matrix type LCD device to which this invention is adapted.
Figure 7:
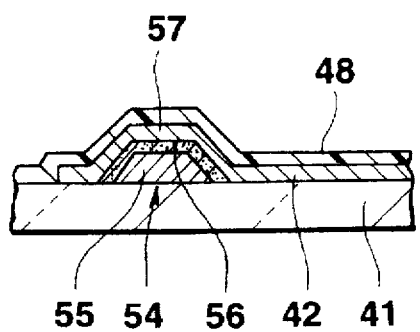
FIG. 7 is a cross-sectional view showing the structure of an MIM element shown in FIG. 6.

FIGS. 6 and 7 illustrate an LCD device that uses, as active elements, 2-terminal elements like MIMs, which has two conductive thin films sandwiching an insulating films and a diode characteristic. FIG. 6 is a plan view of one of the substrates in the LCD device using MIM elements and FIG. 7 is a partial cross-sectional view of the MIM element.

In those diagrams, each MIM 54 comprises a lower electrode 55 formed on a lower substrate 41, an insulating film 56 covering this lower electrode 55, and an upper electrode 57 formed on this insulating film 56. The lower electrodes 55 of each row of MIMs 54 are connected to a drive-signal supply line 58 which is laid on the lower substrate 41 for each row of pixel electrode 43. The upper electrode 57 of each MIM 54 is connected to the associated pixel electrode 43.

The lower electrode 55 of the MIM 54 and the signal supply line 58 are integrally formed of a Ta, Al or an Al-base metal film or the like. The upper electrode 57 is formed of the same metal film as the metal film of the lower electrode 55, or is formed integral with the pixel electrode 43 by the same transparent conductive film as the pixel electrode 43. The insulating film 56 of the MIM 54 is formed by performing anode oxidation on the surfaces of the lower electrode 55 and the signal supply line 58, and the surface of the signal supply line 58 is covered with the insulating film (anode oxide film) 56 excluding the terminal portion (not shown).

Those MIMs 54 are arranged in a matrix form in rows (horizontal direction in FIG. 6) and columns (vertical direction in FIG. 6), with a transparent aligning film 48 formed on those MIMs 54.

The opposing electrodes (scan electrodes) 59 (indicated by the two-dot chain line in the diagram) separated for the individual columns are arranged on the upper substrate (not shown) facing the lower substrate 41.

The method of driving this LCD device will now be described.

First, a column driver 61 sequentially applies a select signal to the opposing electrodes 59 for a predetermined select period to select (scan) a column of pixels.

A row driver 60 applies a voltage equivalent to the sum of the signal voltage to be written in the selected column of pixels and the ON voltage of the MIMs 54, to each signal supply line 58. The difference between the voltage applied to the selected opposing electrodes 59 and the voltage applied to the signal supply lines 58 becomes higher than the ON voltage of the MIMs 54, enabling the selected column of MIMs 54. As a result, a nearly signal voltage is applied to the LC layer. When the select period for each column ends and the select signal is disabled, the MIMs 54 in that column are also turned off. Consequently, the voltage which has been applied to the liquid crystal so far is retained in the LC capacitor until the next select period and the held voltage is kept applied to the liquid crystal. By controlling this retained voltage, therefore, the alignment state of the liquid crystal is controlled to be able to provide the desired gradation display.

The LCD device which uses 2-terminal elements like MIMs has a simpler active element structure than the above-described LCD device using TFTs. It is therefore possible to acquire an LCD device with a simple structure and through a simple manufacturing process.

The structures of the reflectors 18 and 33 or the like may be modified as desired. For example, the reflector may be located on the inner wall of the substrate 12 with electrodes formed thereon via an insulating film.

This invention may also be adapted to a transparent type LCD device which uses no reflector 18 or 33.

What is claimed is:

1. A liquid crystal display device comprising:

a first substrate with a first electrode formed thereon and subjected to a substantial homeotropic aligning treatment;

a second substrate facing said first substrate with a predetermined gap therebetween, said second substrate having a second electrode formed on a surface facing said first substrate and subjected to a homogeneous aligning treatment in a predetermined direction; and a chiral nematic liquid crystal aligned at a predetermined twist angle, sealed between said first and second substrates and added with a dichroic dye.

2. The liquid crystal display device according to claim 1, wherein said chiral nematic liquid crystal satisfies an inequality involving a cell gap $d$, a twist angle $\theta$ (radians) and a natural pitch $p$:

$$(\theta/2\pi)-(\frac{1}{4})<d/p<(\theta/2\pi)+(\frac{1}{4}) \tag{5}$$

3. The liquid crystal display device according to claim 2, wherein said twist angle $\theta$ of said liquid crystal is equal to or greater than $0.5\pi$ radians and smaller than $(5/3)\pi$ radians.

4. The liquid crystal display device according to claim 2, wherein said twist angle $\theta$ of said liquid crystal is equal to or greater than $\pi$ radians and smaller than $(5/3)\pi$ radians.

5. The liquid crystal display device according to claim 1, wherein said chiral nematic liquid crystal satisfies an inequality involving a cell gap $d$, a twist angle $\theta$ (radians) and a natural pitch $p$:

$$\theta/2\pi<d/p<(\theta/2\pi)+(\frac{1}{4}) \tag{6}$$

6. The liquid crystal display device according to claim 5, wherein said twist angle $\theta$ of said liquid crystal is equal to or greater than $0.5\pi$ radians and smaller than $(5/3)\pi$ radians.

7. The liquid crystal display device according to claim 5, wherein said twist angle $\theta$ of said liquid crystal is equal to or greater than $\pi$ radians and smaller than $(5/3)\pi$ radians.

8. The liquid crystal display device according to claim 1, wherein said liquid crystal display device comprises a reflection type display device having a reflector.

9. The liquid crystal display device according to claim 1, wherein said first substrate has a homeotropic aligning film formed on said first electrode and subjected to an aligning treatment in a direction which intersects in said predetermined direction at the angle corresponding to said predetermined twist angle at which said chiral nemateic liquid crystal is aligned; and said second substrate has a homogeneous aligning film formed on said second electrode and subjected to a homogeneous aligning treatment in said predetermined direction.

10. A liquid crystal display device comprising:

first and second substrates;

a liquid crystal sealed between said first and second substrates, aligned substantially homeotropicly in a vicinity of said first substrate, aligned substantially homogeneously in a vicinity of said second substrate, end twisted toward said first substrate from said second substrate within an angle of $0.5\pi$ radians or greater and smaller than $(5/3)\pi$ radians;

a dichroic dye added to said liquid crystal; and drive means for applying a voltage to said liquid crystal to control an alignment state thereof.

11. The liquid crystal display device according to claim 10, wherein said liquid crystal satisfies an inequality involving a cell gap $d$, a twist angle $\theta$ (radians) and a natural pitch $p$:

$$(\theta/2\pi)-(\frac{1}{4})<d/p<(\theta/2\pi)+(\frac{1}{4}) \tag{7}$$

12. The liquid crystal display device according to claim 10, wherein said liquid crystal satisfies an inequality involving a cell gap $d$, a twist angle $\theta$ (radians) and a natural pitch $p$:

$$\theta/2\pi<d/p<(\theta/2\pi)+(\frac{1}{4}) \tag{8}$$

13. The liquid crystal display device according to claim 10, wherein said liquid crystal is twisted within an angle of $\pi$ radians or greater and smaller than $(5/3)\pi$ radians.

* * * * *